United States Patent
Kugler (10) Patent No.: US 7,605,822 B1
(45) Date of Patent: Oct. 20, 2009

(54) METHOD AND SYSTEM FOR PERFORMING TEXTURE MAPPING ACROSS ADJACENT TEXTURE MAPS

(75) Inventor: Anders M. Kugler, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 345 days.

(21) Appl. No.: 11/566,669

(22) Filed: Dec. 4, 2006

(51) Int. Cl.
*G09G 5/00* (2006.01)

(52) U.S. Cl. .................. 345/582; 345/581; 345/587; 345/552; 345/564; 345/565

(58) Field of Classification Search ........... None
See application file for complete search history.

(56) References Cited

U.S. PATENT DOCUMENTS

| | | | | |
|---|---|---|---|---|
| 5,230,039 A | * | 7/1993 | Grossman et al. | 345/582 |
| 5,801,708 A | * | 9/1998 | Alcorn et al. | 345/587 |
| 6,768,492 B2 | * | 7/2004 | Dorbie et al. | 345/582 |
| 6,819,324 B2 | * | 11/2004 | Emberling | 345/540 |

* cited by examiner

*Primary Examiner*—Antonio A Caschera
(74) *Attorney, Agent, or Firm*—Patterson & Sheridan, LLP (57) ABSTRACT

A method and system for performing texture mapping across adjacent texture maps. Specifically, one embodiment of the present invention sets forth a method, which includes the steps of determining whether a texel crosses a boundary of a first texture map, examining a first texture state identifier associated with the first texture map, and requesting for a second texture state identifier associated with a second texture map that is adjacent to the first texture map to enable traversal to the second texture map to access the texel if the first texture state identifier includes a mode indicative of wrapping to an adjacent texture map and texture adjacency information that points to a second texture map.

20 Claims, 8 Drawing Sheets

METHOD AND SYSTEM FOR PERFORMING TEXTURE MAPPING ACROSS ADJACENT TEXTURE MAPS

BACKGROUND OF THE INVENTION

1. Field of the Invention

The present invention generally relates to computer graphics and more particularly to a method and system for performing texture mapping across adjacent texture maps.

2. Description of the Related Art

Unless otherwise indicated herein, the approaches described in this section are not prior art to the claims in this application and are not admitted to be prior art by inclusion in this section.

A graphics system generally adopts a highly parallel and pipelined architecture to meet the ever increasing processing demands for realism, quality, and real-time interactivity of displayed images and videos. To determine the final surface properties of an object or image, one of the functions performed by a shader engine in a rendering pipeline includes texture mapping. Conventionally, the texture mapping operation involves a process by which texture elements in the texture coordinate space are mapped or wrapped onto a computer-generated object. In particular, for each rendered pixel in the screen space, selected texture elements are used to either substitute for or scale one or more material properties of the object's surface. A texture element, also called texel in the art of computer graphics, is an elementary portion of the texture mapping image used to define texture characteristics such as color attributes, lighting, and transparency.

Recently developed computer graphics applications, such as scientific visualization or oil exploration systems, are becoming increasingly complex and demanding higher image details. Texture mapping operations in these applications tend to involve storing and processing very large texture maps. Since existing graphics hardware solutions have limited memory resources, one current texture mapping technique breaks a large texture map into a smaller set of texture maps, each of which is referred to as a "tile" herein, and is addressed individually within memory. Rather than dealing with the large texture map in its entirety, the graphics hardware thus maps only from one smaller piece of the large texture map at a time.

The current approach of breaking a large texture map into multiple smaller tiles that are then treated as separate, unrelated texture maps has a number of shortcomings, especially in dealing with borders between neighboring tiles. For example, without a mechanism to directly access the texels of an adjacent tile, one operating mode specifies an overlapping border area between two neighboring tiles, where the overlapping border area contains replicated texels from each of the two tiles. To carry out linear filtering under this operating mode, the device driver for the graphics processing unit (GPU) first replicates the relevant texels to generate the overlapping border area and then accesses these replicated texels by deploying a texture filter kernel of a fixed size (e.g., 2×2), which corresponds to the size of the overlapping border area. Although this mode allows texels residing in a neighboring tile to be accessed in filtering operations, the number of such texels is limited by the size of the specified overlapping border area. Further, the larger the specified overlapping border area is, the more data the device driver has to copy and the more likely the increased memory and processing requirements necessary to handle the larger overlapping border area will be prohibitively costly.

Other operating modes implemented when a large texture map is broken into a set of smaller tiles also suffer from certain drawbacks. In particular, these operating modes involve clamping, repeating, and mirroring mechanisms, none of which attempts to extend texture mapping beyond the border of a particular tile. For example, suppose linear filtering is performed at the border of two neighboring tiles, a left tile and a right tile, and suppose a filtering operation is currently operating on the left tile. If a texture request is made for a texel residing in the right tile, under these modes, the system would only identify a texel within the left tile to satisfy the request and does not attempt to access any texel or replicated texel beyond the border of the left tile. Consequently, these operating modes tend to yield lower image quality.

As the foregoing illustrates, what is needed in the art is a technique to access texels in adjacent texture maps that address at least one of the problems set forth above.

SUMMARY OF THE INVENTION

A method and system for performing texture mapping across adjacent texture maps are disclosed. Specifically, one embodiment of the present invention sets forth a method, which includes the steps of determining whether a texel crosses a boundary of a first texture map, examining a first texture state identifier associated with the first texture map, and requesting for a second texture state identifier associated with a second texture map that is adjacent to the first texture map to enable traversal to the second texture map to access the texel if the first texture state identifier includes a mode indicative of wrapping to an adjacent texture map and texture adjacency information that points to a second texture map.

At least one advantage of the invention disclosed herein is the ability to efficiently traverse a chain of multiple texture maps during texture mapping operations, thereby enabling more sophisticated and higher quality texture operations relative to prior art systems and techniques.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

A method and system for performing texture mapping across adjacent texture maps are disclosed. In the following description, for the purposes of explanation, numerous specific details are set forth in order to provide a thorough understanding of the present invention. It will be apparent, however, to one skilled in the art that the present invention may be practiced without these specific details.

Throughout this disclosure, the terms "texture map" and "texture image" are used interchangeably. A "boundary" and a "border" of a texture map are also used interchangeably. Two texture maps are said to be "adjacent" if they share a common border, which is a line for 2D texture maps and is a slice for 3D texture maps and thereby having a common dimension (2D case) or dimensions (3D case). Unless otherwise indicated, according to one embodiment of the invention, the texels in two adjacent texture maps also share the same number of components, such as, without limitation, color attributes (red, green, and blue), transparency, and the like, and the same texture formats (e.g., RGBA8, DXT1, or others). Each texture map is associated with a texture state identifier, examples of which are described below in conjunction with FIG. 3 and FIG. 7. Also, some examples of a "computer-readable medium" referred to herein include, without limitation, non-volatile media (e.g., optical or magnetic disks) and volatile media (e.g., dynamic memory).

Figure 1:
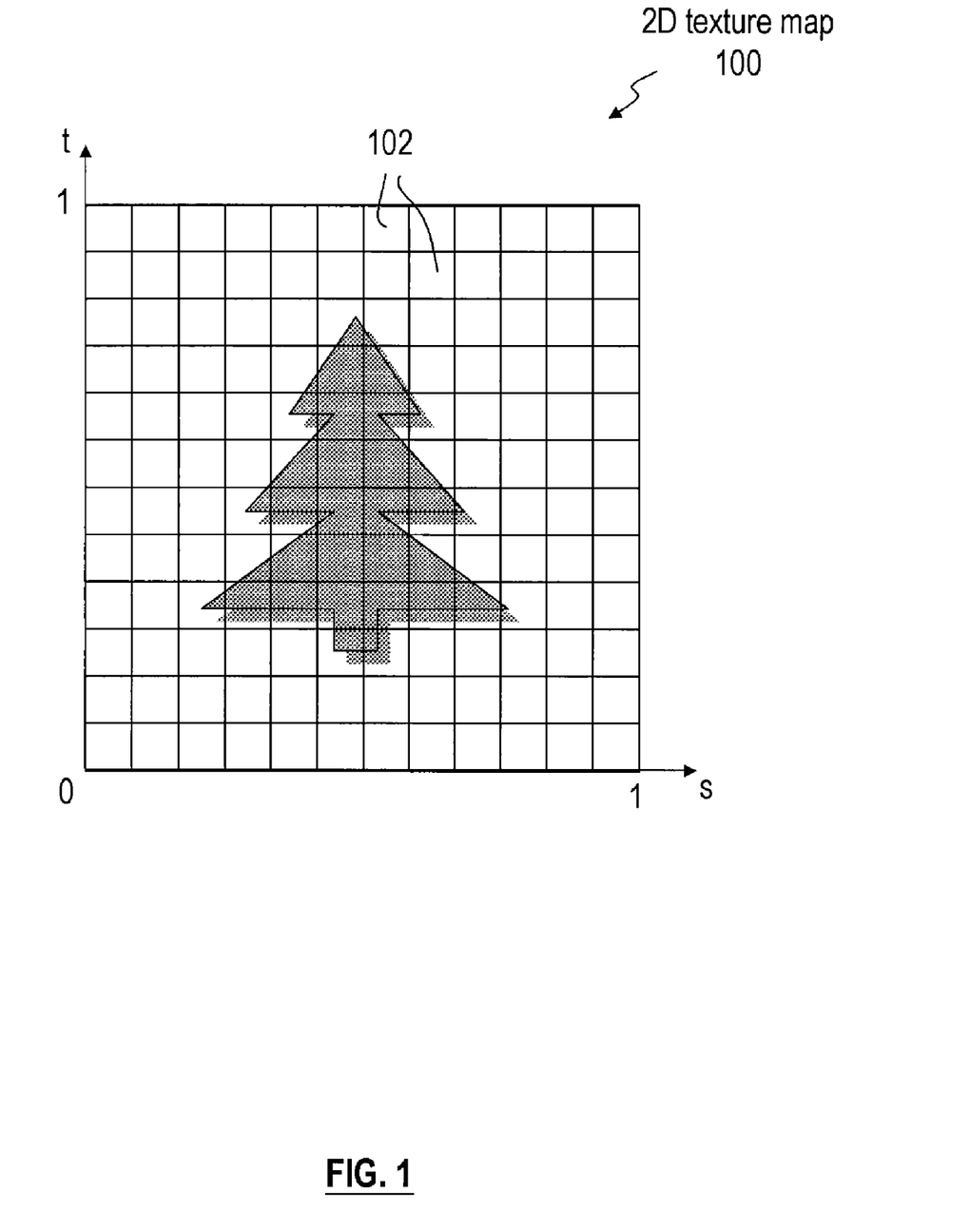
FIG. 1 illustrates a typical 2-dimensional ("2D") texture map, which can be processed by one embodiment of the invention.

FIG. 1 illustrates a typical 2-dimensional ("2D") texture map, which can be processed by one embodiment of the invention. 2D texture map 100 includes a 2D array of texels, each denoted as texel 102 and including attributes such as color, lighting, transparency, and other similar characteristics. Each 2D texture map 100 is further associated with a texture coordinate system (s, t) that is generally normalized to the range of [0, 1]. For example, the axis "s" supports the width dimension of the texture map, while the axis "t" supports the height dimension of the texture map. Accordingly, the pair (s=0, t) defines the left border of 2D texture map 100, where the border here refers to a line; the pair (s=1, t) defines the right border; the pair (s, t=0) defines the floor or the bottom border; and the pair (s, t=1) defines the ceiling or the top border of 2D texture map 100.

Figure 2:
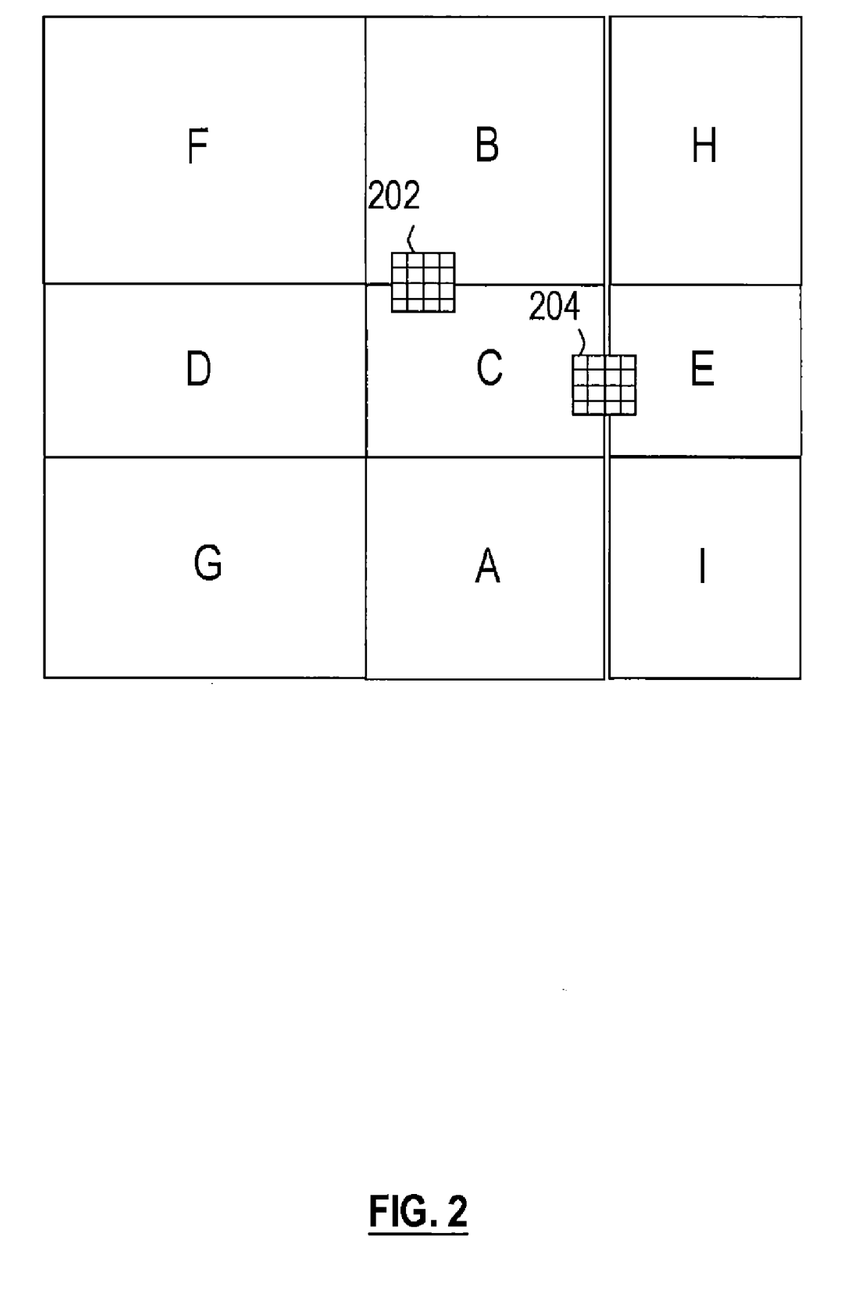
FIG. 2 illustrates cross-boundary texture sampling in multiple 2D texture maps, according to one embodiment of the invention.

FIG. 2 illustrates cross-boundary texture sampling in multiple 2D texture maps, according to one embodiment of the invention. As shown, each of the 2D texture maps, which may be derived from breaking down a large texture map, is distinctly designated with an alphabetical symbol, such as A, B, C, D, E, F, G, H, and I, and is associated with its own set of coordinate system in the normalized range of [0, 1]. Specifically, in one implementation, when the device driver for a GPU recognizes that a texture map is too large to be handled properly with the GPU hardware resources that are available, the driver breaks the texture map into the set of smaller adjacent texture maps or tiles. One reason for the driver to consider the texture map being "too large" is when the processing of the texture map exceeds the intrinsic limitations of the selected GPU hardware. Some examples of these intrinsic limitations include the number of bits that are available for the un-normalized u and v coordinates and the wrapping tables that have fixed sizes and impose a maximum width or height for the texture map. Another reason is when the processing of the texture map exceeds certain storage and/or memory bandwidth limitations. For instance, the driver may break a large texture map into smaller chunks for better memory usage shared by a pool of active textures. As shown in FIG. 2, the large texture map is broken into nine such smaller texture maps or tiles. One feature these 2D texture maps share is that they do not have overlapping portions of replicated data among them. Another feature is that any two 2D adjacent texture maps share a common border and therefore have a common width or height dimension. Using the texture map C as an example, it shares two common borders in the height direction respectively with the neighboring texture maps D and E, and therefore has a common height dimension with these texture maps. Texture map C also shares two common borders in the width direction respectively with the neighboring texture maps A and B, and therefore also shares a common width dimension with these texture maps. In other words, the texture map C has four adjacent texture maps, A, B, D, and E. According to one embodiment of the invention, texture sample groups 202 and group 204 spanning texture maps C and B and texture maps C and E, respectively, can be accessed in a texture mapping technique of the present invention, which is detailed in subsequent paragraphs.

Figure 3:
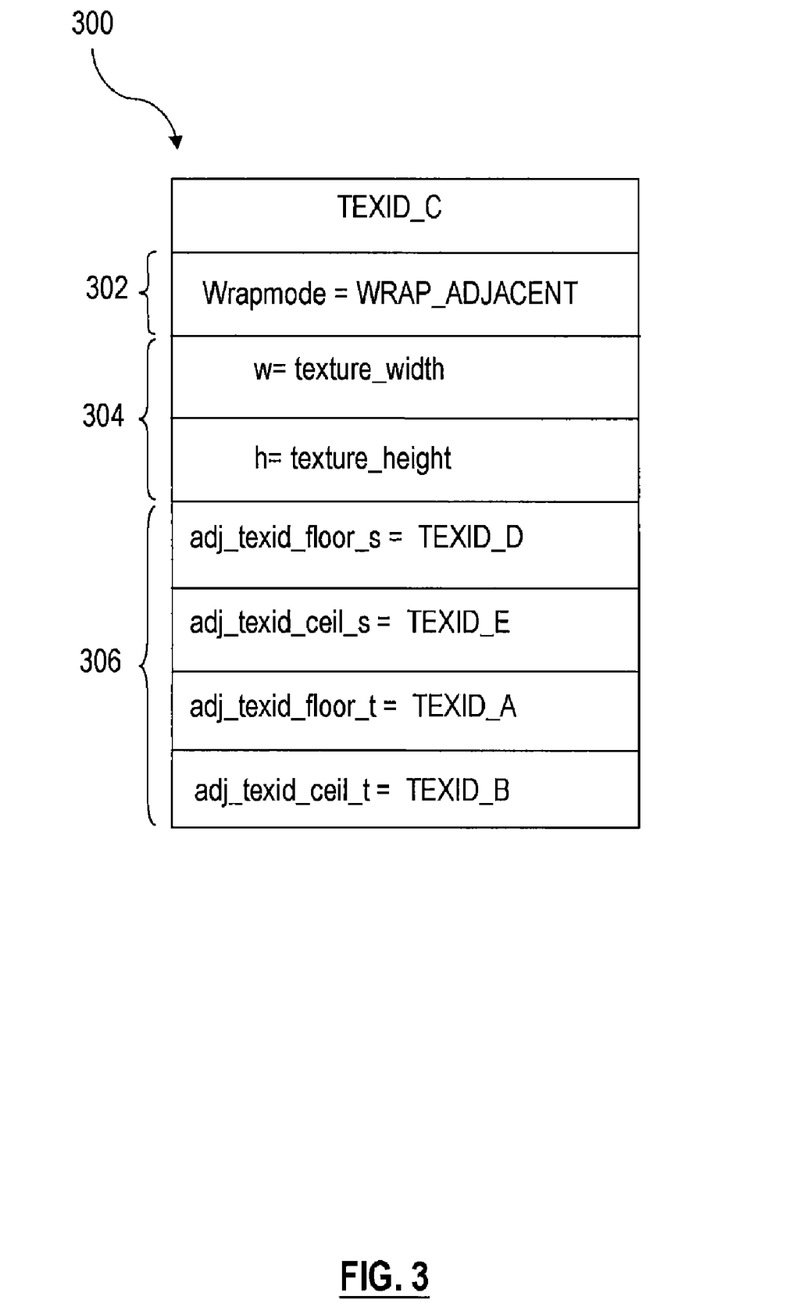
FIG. 3 illustrates an example of a texture state identifier associated with a 2D texture map, according to one embodiment of the invention.

To enable texels to be accessed across the borders of 2D adjacent texture maps or tiles, such as those shown in FIG. 2, in one embodiment, the device driver is responsible for establishing the relevant state information associated with each of the texture maps and then for providing the appropriate state information to the texture unit when performing a particular texture mapping operation. FIG. 3 illustrates an example of a texture state identifier, TEXID_C 300, which is associated with the texture map C of FIG. 2 and contains the state information for texture map C needed to perform a texture mapping operation across one or more adjacent texture maps. To set up TEXID_C 300, the device driver first determines which of the other texture maps of FIG. 2 are adjacent to texture map C. If the device driver determines that adjacency conditions are met between the texture map C and at least one neighboring texture map (e.g., when the two texture maps share a common border and dimension and also include texels with an equal number of components), then the device driver sets wrapmode information 302 with "WRAP_ADJACENT" in TEXID_C 300, signifying the activation of a special mode to wrap into this neighboring texture map from the texture map C. The device driver also sets w and h in dimension information 302 with the width and height information of the texture map C, respectively. More importantly, the device driver identifies all the texture maps that are determined to be adjacent to the texture map C and sets up adjacency information 306 in the TEXID_C 300. Referring again to FIG. 2, the texture map adjacent to the floor border in the t dimension of the texture map C is the texture map A; the texture map adjacent to the ceiling border in the t dimension of the texture map C is the texture map B; the texture map adjacent to the floor border in the s dimension of the texture map C is the texture map D; and the texture map adjacent to the ceiling border in the s dimension of the texture map C is the texture map E.

Figure 4:
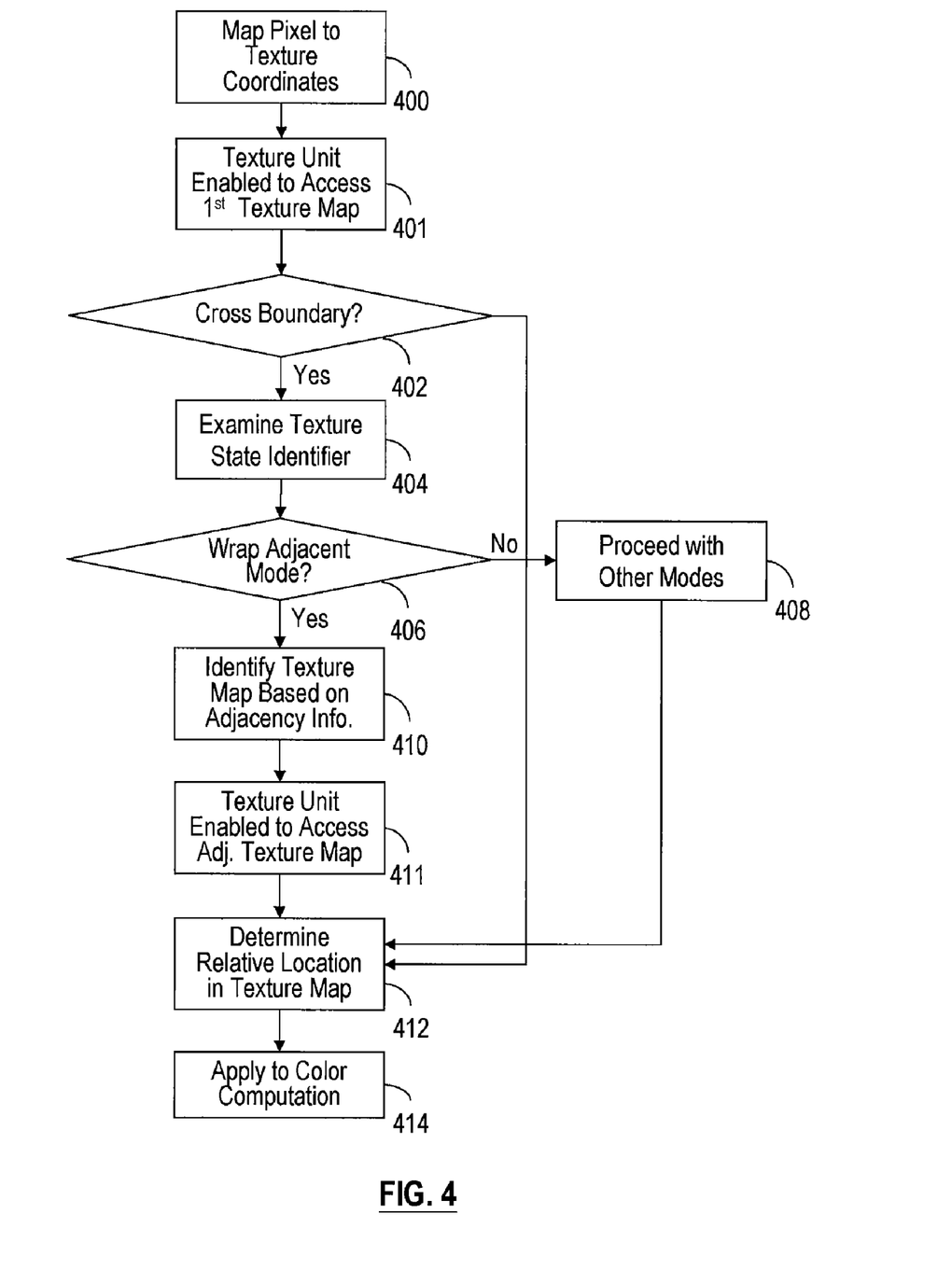
FIG. 4 is a flowchart of method steps for performing a texture mapping operation across adjacent texture maps, according to one embodiment of the invention.

The additional state information that identifies adjacent texture maps, enables the texture unit to access texels in adjacent texture maps, if necessary, when performing a texture mapping operation. FIG. 4 is a flowchart of method steps for performing a texture mapping operation across adjacent texture maps, according to one embodiment of the invention. In step 400, in response to a texture mapping operation initiated by a shader program being executed within a pixel shader engine, the texture unit initiates the mapping of the screen space coordinates of a pixel to texture space coordinates. In one embodiment, the center of the pixel is mapped into texture coordinate space, and the texture map in which the pixel center is located is determined (referred to as the "first texture map"). In step 401, the device driver provides the texture state identifier for the first texture map to the texture unit to enable the texture unit to access the first texture map in memory. Depending on the type of filtering being implemented by the texture unit when performing the texture mapping operation (e.g., bilinear filtering), multiple texels may be used to compute the color value of the pixel, and these texels may come from multiple texture maps. In step 402, the texture unit determines whether each texel used to computer the color value of the pixel belongs to the first texture map. If the texel indeed belongs to the first texture map, then the texture unit locates the texel in the first texture map in step 412.

On the other hand, if the coordinates of the texel fall outside of the boundary of the first texture map, then the texture unit examines the texture state identifier for the first texture map in step 404. If, in step 406, the texture state identifier indicates a mode of wrapping to an adjacent texture map, then the method proceeds to step 410. In step 410, the texture unit identifies the different adjacent texture maps based on the texture adjacency information in the texture state identifier and then determines which of the adjacent texture maps includes the texel. If, however, in step 406, no wrapping mode is indicated, then in step 408, other modes, such as clamping, repeating, or mirroring discussed above, may be invoked to process the texel. In step 411, the texture unit requests the state information for the appropriate adjacent texture map from the device driver. In response, the device driver provides the texture state identifier for the adjacent texture map to the texture unit to enable the texture unit to access the adjacent texture map in memory. In step 412, the texture unit proceeds to determine the location of the texel in the adjacent texture map. Regardless of whether the texel comes from the first texture map or the adjacent texture map, in step 414, the texel values retrieved from texture memory are used to compute the color for the pixel.

Using the texture map C shown in FIG. 2 and TEXID_C 300 of FIG. 3, how the texture state identifier may be used in the aforementioned texture mapping operation is further explained. In one implementation, to establish whether a boundary is crossed in step 402, the coordinates of the texel is compared against the borders of the texture map C, which can be derived from dimension information 304, such as w and h. For purpose of discussion only, suppose wrapmode information 302 indicates WRAP_ADJACENT. Thus, according to texture adjacency information 306, the operations in step 410 would yield the following results: if the coordinates of the texel correspond to a position below the floor border in the t dimension of the texture map C, then the texture unit determines the texture map A to be the adjacent texture map including the texel; if the coordinates of the texel correspond to a position above the ceiling border of the texture map C in the t dimension, then the texture unit determines the texture map B to be the adjacent texture map including the texel; if the coordinates of the texel correspond to a position below the floor border of the texture map C in the s dimension, then the texture unit determines the texture map D to be the adjacent texture map including the texel; and if the coordinates of the texel correspond to a position above the ceiling border of the texture map C in the s dimension, then the texture unit determines the texture map E to be the adjacent texture map including the texel.

Moreover, the texture mapping operation discussed above may operate on texture maps of any arbitrary sizes and may traverse an unlimited chain of texture maps. To illustrate, suppose the texture unit is currently operating on the texture map C and is directed to access the texture map B based on texture adjacency information 306 of TEXID_C 300 and the coordinates of the texel. Then, after the texture unit receives the texture state identifier associated with the texture map B (the "TEXID_B") from the device driver and begins accessing the texture map B in memory, based on the texture adjacency information specified in the TEXID_B, the texture unit may then be further directed to request for information relating to the texture map F, and this traversal of a chain of texture maps may continue as need be. With this traversal capability, no conventionally overlapping between any two neighboring texture maps is needed. It should be apparent to a person skilled in the art to implement texture state identifiers to be configurable by software, so that some of the information, such as texture map dimensions and texture adjacency information may be modified when appropriate.

Figure 5:
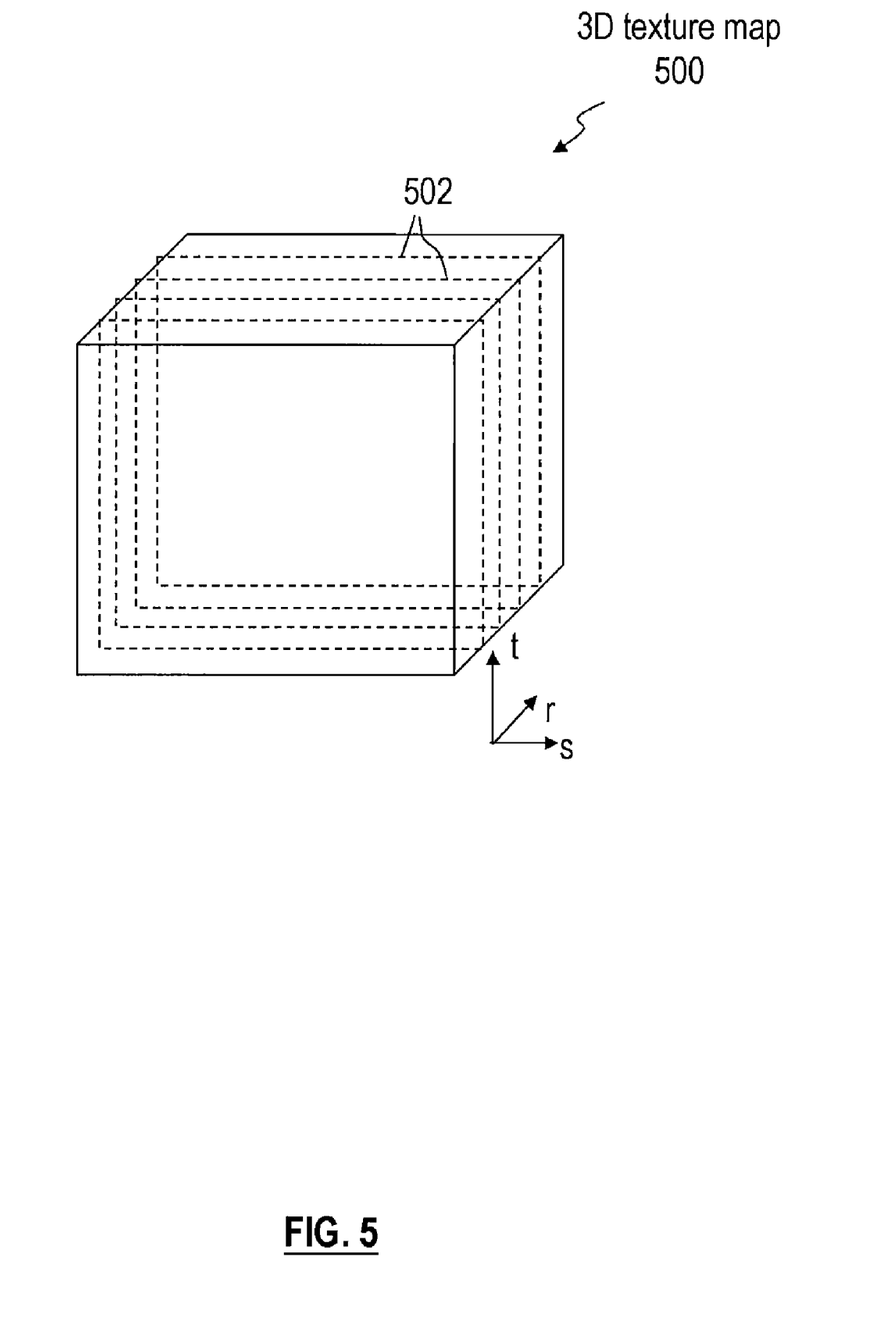
FIG. 5 illustrates a typical 3-dimensional ("3D") texture map, which can be processed by one embodiment of the invention.

Although the discussions above mainly use 2D texture maps as examples, the texture mapping process can also operate on 3D texture maps. FIG. 5 illustrates a typical 3-dimensional ("3D") texture map, which can be processed by one embodiment of the invention. 3D texture map 500 is similar to 2D texture map 100 shown in FIG. 1 but includes an additional dimension. 3D texture map 500 can be seen as a group of slices that are parallel to one another along an axis "r," which is perpendicular to the directions represented by (s, t), where each slice 502 is a 2D texture map. Each texel in 3D texture map 500 is thus associated with the coordinate set (s, t, r), "s" defining a width dimension, "t" defining a height dimension, and "r" defining a depth dimension. Each of the coordinates (s, t, r) can also be normalized to the range of [0, 1]. The coordinates (s=0, t, r) thus define the left or the floor border in the s dimension, where the border here refers to a 2D surface or a face; the coordinates (s=1, t, r) define the right or the ceiling border in the s dimension; the coordinates (s, t=0, r) define the bottom or the floor border in the t dimension; the coordinates (s, t=1, r) define the top or the ceiling border in the t dimension; the coordinates (s, t, r=0) define the front or the floor border in the r dimension; and the coordinates (s, t, r=1) define the rear or the ceiling border in the r dimension of 3D texture map 500.

Figure 6:
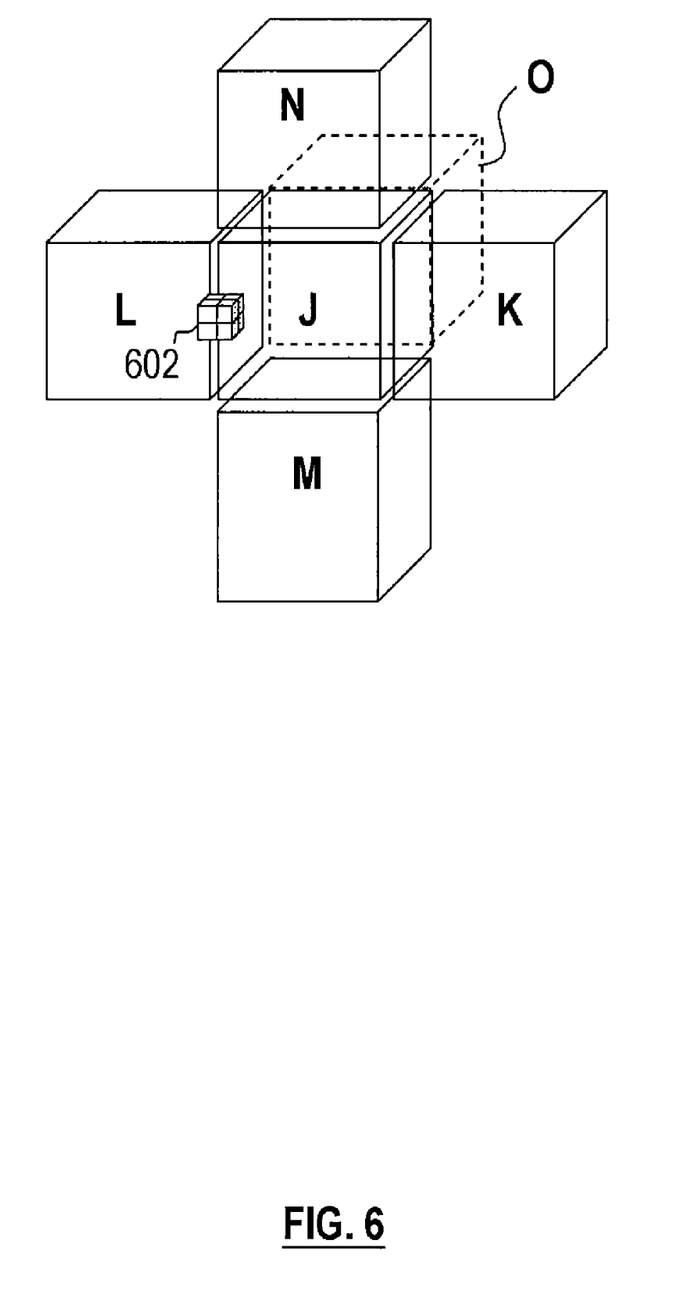
FIG. 6 illustrates cross-boundary texture sampling in multiple 3D texture maps, according to one embodiment of the invention.

FIG. 6 illustrates cross-boundary texture sampling in multiple 3D texture maps, according to one embodiment of the invention. As shown, each of the 3D texture maps, which may be derived from breaking down a large volumetric texture map, is distinctly designated with an alphabetical symbol, such as J, K, L, M, N, and O, and is associated with its own set of coordinate system in the normalized range of [0, 1]. Similar to the 2D texture maps discussed above, one feature these 3D texture maps share is the lack of overlapping portions of replicated data. Another feature is that any two adjacent texture maps share a common face and therefore have two common dimensions among the width, height, and depth dimensions. Using the texture map J as an example, it respectively shares a common face with each of the neighboring texture maps L and K in the two planes specified by the height (t) and depth (r) dimensions, a common face with each of the neighboring texture maps M and N in the two planes specified by the width (s) and depth (r) dimensions, and a common face with the neighboring texture map O in a plane specified by the width (t) and height (s) dimensions. In other words, texture map J has five adjacent texture maps, K, L, M, N, and O. Potentially, a 3D texture map could have six adjacent texture maps. According to one embodiment of the invention, texture sample group 602 spanning the texture maps J and L can be accessed in a texture mapping technique of the present invention detailed above.

Figure 7:
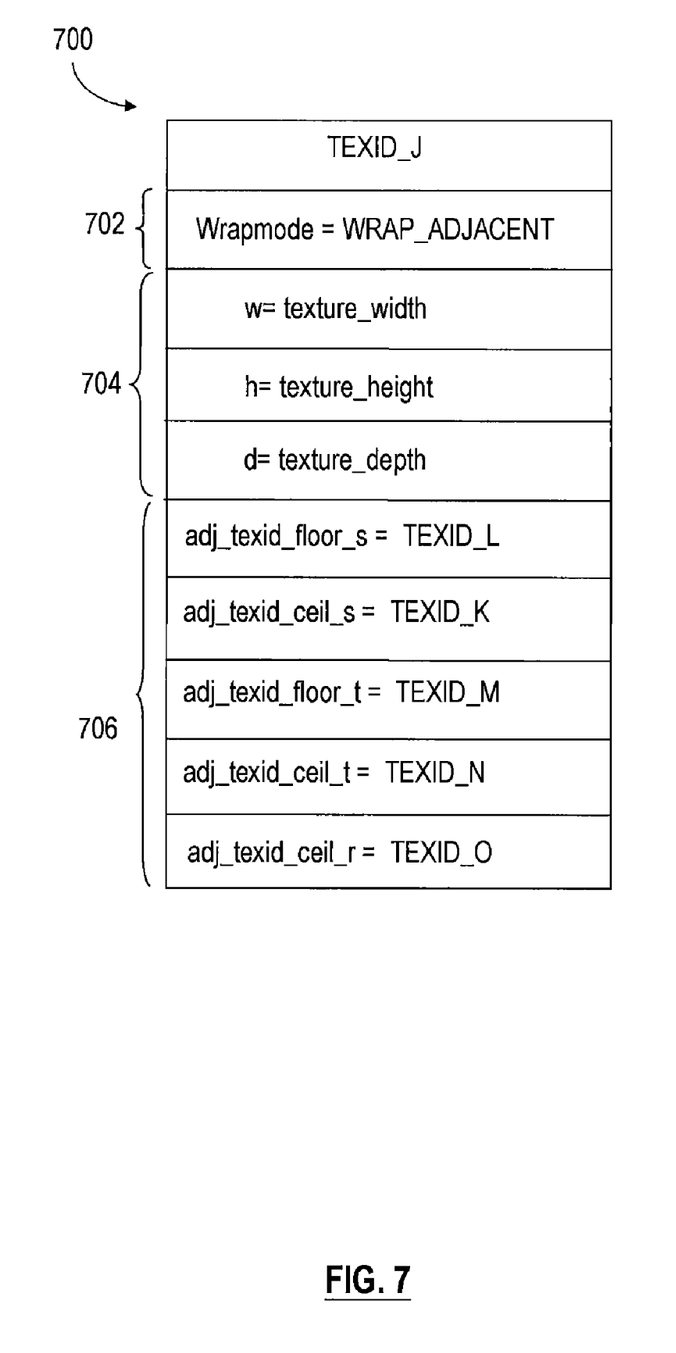
FIG. 7 illustrates another example of a texture state identifier associated with a 3D texture map, according to an embodiment of the invention.

To illustrate the aforementioned process of using the texture state identifier to access adjacent 3D texture maps, the texture map J shown in FIG. 6 and the associated TEXID_J 700 shown in FIG. 7 are used. Similar to TEXID_C 300, TEX_ID J 700 also includes wrapmode information 702, dimension information 704, and texture adjacency information 706 all relating to the texture map J. However, unlike TEX_ID C 300, texture adjacency information 706 of TEX_ID J 700 can specify up to six boundary conditions and six adjacent texture maps, and five of which are shown in FIG. 7. Specifically, according to texture adjacency information 706, the operations in step 410 of FIG. 4 would yield the following results: if the coordinates of the texel correspond to a position below the floor border in the s dimension of the texture map J, then the texture unit determines the texture map L to be the adjacent texture map including the texel; if the coordinates of the texel correspond to a position above the ceiling border of the texture map J in the s dimension, then the texture unit determines the texture map K to be the adjacent texture map including the texel; if the coordinates of the texel correspond to a position below the floor border of the texture map J in the t dimension, then the texture unit determines the texture map M to be the adjacent texture map including the texel; if the coordinates of the texel correspond to a position above the ceiling border of the texture map J in the t dimension, then the texture unit determines the texture map N to be the adjacent texture map including the texel; and if the coordinates of the texel correspond to a position above the ceiling border of the texture map J in the r dimension, then the texture unit determines the texture map O to be the adjacent texture map including the texel.

Figure 8:
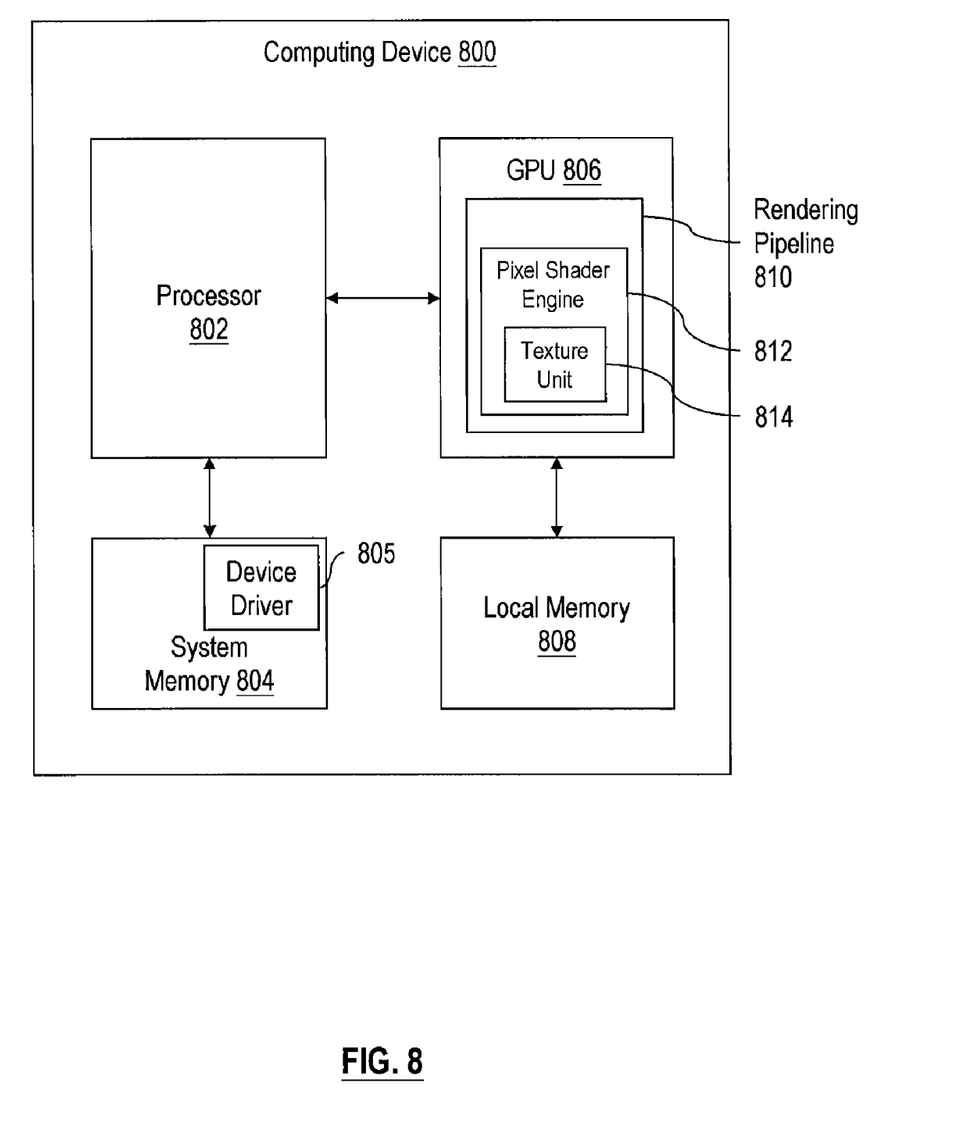
FIG. 8 is a conceptual diagram of a computing device configured to implement one or more embodiments of the present invention.

FIG. 8 is a conceptual diagram of a computing device configured to implement one or more embodiments of the invention. Computing device 800 includes, without limitation, processor 802, system memory 804, GPU 806 and local memory 808 coupled to GPU 806. System memory 804 contains device driver 805, which is generally configured to manage GPU 806 and is more specifically configured implement different aspects of the present invention, including, without limitation, determining that a given texture map is too large relative to available hardware resources, breaking up the texture map into a set of smaller texture maps or tiles, determining adjacency relationships among the different tiles, generate the aforementioned texture state identifiers for each tile, and to provide the texture state identifiers, as needed, to GPU 806. GPU 806 includes a rendering pipeline 810 used to process data. Rendering pipeline 810 includes a pixel shader engine 812, which further includes a texture unit 814. In alternate embodiments, the processor 802, the GPU 806, the system interface(s) between these two processors, or any combination thereof, may be integrated into a single processing unit. Further, the functionality of the GPU may be included in a chip set or in some other type of special purpose processing unit or co-processor. Persons skilled in the art will recognize that any system having one or more processing units configured to implement the teachings disclosed herein falls within the scope of the present invention. Thus, the architecture of computing device 800 in no way limits the scope of the present invention.

The above description illustrates various embodiments of the present invention along with examples of how aspects of the present invention may be implemented. The above examples, embodiments, and drawings should not be deemed to be the only embodiments, and are presented to illustrate the flexibility and advantages of the present invention as defined by the following claims.

We claim:

1. A computer-implemented method for performing a texture mapping operation across adjacent texture maps, comprising:

determining that a texel crosses a boundary of a first texture map; examining a first texture state identifier associated with the first texture map; and requesting for a second texture state identifier associated with a second texture map that is adjacent to the first texture map to enable traversal to the second texture map to access the texel, if the first texture state identifier includes a mode indicative of wrapping to an adjacent texture map and texture adjacency information pointing to the second texture map;

mapping the texel to a graphics object; and rendering the graphics object, wherein surface properties of the graphics object being rendered include material properties associated with the first texture map and material properties associated with the second texture map.

2. The method of claim 1, further comprising activating the mode in the first texture state identifier if the first texture map and the second texture share a common border.

3. The method of claim 2, further comprising specifying the texture adjacency information in the first texture state identifier with the identity of the second texture map.

4. The method of claim 2, wherein the first texture map and the second texture map have two dimensions and share at least one of the two dimensions.

5. The method of claim 2, wherein the first texture map and the second texture map have three dimensions and share at least two of the three dimensions.

6. The method of claim 2, wherein each texel in the first texture map is defined with a same number of components as each texel in the second texture map.

7. The method of claim 6, wherein each texel in the first texture map shares the same format as each texel in the second texture map.

8. The method of claim 1, wherein the first texture map and the second texture map lack an overlapping portion of duplicated data.

9. The method of claim 1, further comprising:

comparing the coordinates of the texel to the border between the first texture map and the second texture map to determine a selected texture map containing the texel; and deriving an address for a texture memory to retrieve the texel based on the position of the texel within the selected texture map.

10. The method of claim 9, wherein the border between the first texture map and the second texture map is specified in the texture adjacency information associated with the first texture map.

11. A computing device configured to perform a texture mapping operation across adjacent texture maps, the computing device comprising:

a memory; and a processing unit coupled to the memory that includes a texture unit, wherein the texture unit is configured to:

determine whether a texel crosses a boundary of a first texture map, examine a first texture state identifier associated with the first texture map, and request for a second texture state identifier associated with a second texture map adjacent to the first texture map to enable traversal to the second texture map to access the texel if the first texture state identifier includes a mode indicative of wrapping to an adjacent texture map and texture adjacency information pointing to the second texture map.

12. The computing device of claim 11, further including a device driver for managing the processing unit, wherein the device driver activates the mode in the first texture state identifier if the first texture map and the second texture share a common border.

13. The computing device of claim 12, wherein the device driver specifies the texture adjacency information in the first texture state identifier with the identity of the second texture map.

14. The computing device of claim 12, wherein the first texture map and the second texture map have two dimensions and share at least one of the two dimensions.

15. The computing device of claim 12, wherein the first texture map and the second texture map have three dimensions and share at least two of the three dimensions.

16. The computing device of claim 12, wherein each texel in the first texture map is defined with a same number of components as each texel in the second texture map.

17. The computing device of claim 16, wherein each texel in the first texture map shares the same format as each texel in the second texture map.

18. The computing device of claim 11, wherein the first texture map and the second texture map lack an overlapping portion of duplicated data.

19. The computing device of claim 11, wherein the texture unit is further configured to:
  compare the coordinates of the texel to the border between the first texture map and the second texture map to determine a selected texture map containing the texel; and
  derive an address for a texture memory to retrieve the texel based on the position of the texel within the selected texture map.

20. The computing device of claim 19, wherein the border between the first texture map and the second texture map is specified in the texture adjacency information associated with the first texture map.

* * * * *